United States Patent [19]

Jennings

[11] Patent Number: 4,646,948
[45] Date of Patent: Mar. 3, 1987

[54] MEASURING CONTAINER WITH MODIFIED POUR-SPOUT AND METHOD AND APPARATUS FOR FILLING THE SAME

[75] Inventor: J. Thomas Jennings, Mountainside, N.J.

[73] Assignee: Container Mfg. Inc., Middlesex, N.J.

[21] Appl. No.: 783,920

[22] Filed: Oct. 3, 1985

[51] Int. Cl.⁴ ............................................. G01F 11/26
[52] U.S. Cl. .................................... 222/454; 222/158; 141/2
[58] Field of Search ................................ 222/454–457, 222/158, 207; 141/2

[56] References Cited

U.S. PATENT DOCUMENTS

| | | | |
|---|---|---|---|
| 236,997 | 1/1881 | Dodge | 222/456 |
| 562,823 | 6/1896 | Heysinger | 141/18 |
| 570,759 | 11/1896 | Law | 222/456 |
| 697,830 | 4/1902 | Franc | 222/455 |
| 1,009,550 | 11/1911 | Moys et al. | 222/49 |
| 1,093,740 | 4/1914 | Stevenson | 222/158 |
| 1,227,658 | 5/1917 | Prenosil | 222/424.5 |
| 1,282,103 | 10/1918 | Mostat | 222/567 |
| 1,373,535 | 4/1921 | Smith, Jr. | 222/456 |
| 1,438,892 | 11/1922 | Boykin | 222/442 |
| 1,865,269 | 6/1932 | Munday | 222/517 X |
| 1,924,809 | 8/1933 | Schuelke et al. | 222/455 |
| 2,017,209 | 10/1935 | Kennedy | 222/158 |
| 2,091,929 | 8/1937 | Kappenberg | 222/455 |
| 2,584,130 | 2/1952 | Huebl et al. | 222/455 |
| 2,645,388 | 1/1953 | Hester | 222/454 |
| 2,728,490 | 12/1955 | Scannell et al. | 222/454 X |
| 2,980,297 | 4/1961 | Tucci | 222/158 |
| 3,058,633 | 10/1962 | Muhloff | 222/568 |
| 3,187,965 | 6/1965 | Bourget | 222/518 |
| 3,235,143 | 2/1966 | Goodrich | 222/454 |
| 3,254,809 | 6/1966 | Breneman | 222/442 |
| 3,347,420 | 10/1967 | Donoghue | 222/129 |
| 3,396,875 | 8/1968 | Finch | 222/456 |
| 3,401,840 | 9/1968 | McConnell et al. | 222/158 |
| 3,451,446 | 6/1969 | Russell | 141/319 |
| 3,750,915 | 8/1973 | Kearney | 222/567 |
| 3,948,105 | 4/1976 | Johnson, Jr. | 73/427 |
| 4,069,946 | 1/1978 | Feider | 222/475 X |
| 4,079,859 | 5/1978 | Jennings | 222/437 X |
| 4,298,038 | 11/1981 | Jennings | 141/2 |
| 4,432,763 | 2/1984 | Manschot et al. | 222/456 X |

*Primary Examiner*—H. Grant Skaggs
*Assistant Examiner*—Jay I. Alexander
*Attorney, Agent, or Firm*—Martha G. Pugh

[57] ABSTRACT

This invention relates to improvements in a container for measuring discrete quantities of poured-out liquid, which comprises a primary storage container, a measuring head, and a modified pour-spout, formed as a unitary body. The improvements include a first embodiment having a single pour-out mouth, also serving as a filler opening, wherein a removable insert plug formed integrally with the modified pour-spout is interposed into the neck between the measuring head and the primary container. In a second embodiment including a single pour-out opening, and a removable plug between the measuring head and the primary storage container, the modified pour-spout is formed integrally at the back of the measuring head by a compression-molding process. In another embodiment, having a single pour-out opening, an annular bulge interposed in the neck between the measuring head and the primary storage container provides an orifice for filling, and is collapsed to provide closure. In another embodiment having a separate filler opening and a closed neck, the modified pour-spout is compression-molded.

16 Claims, 22 Drawing Figures

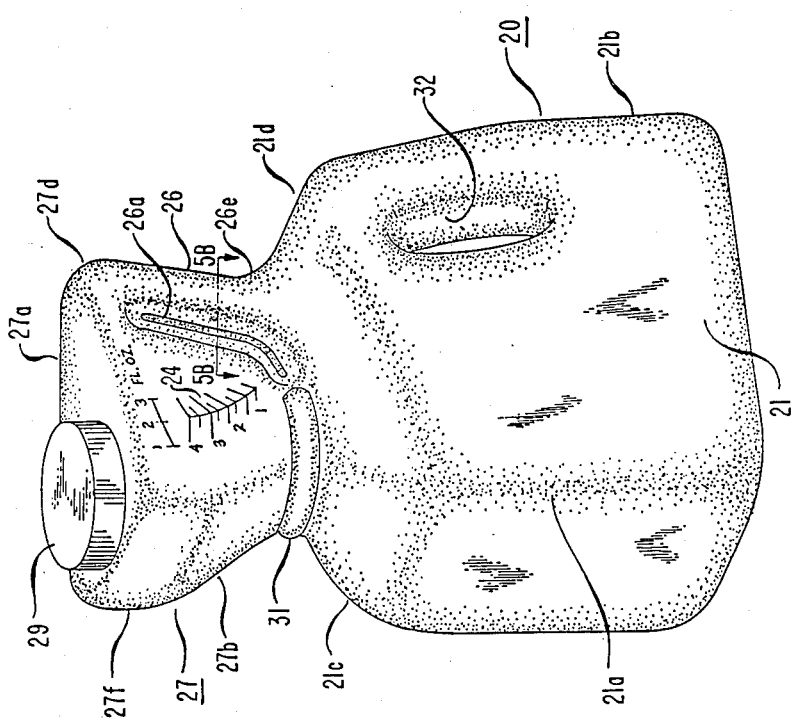

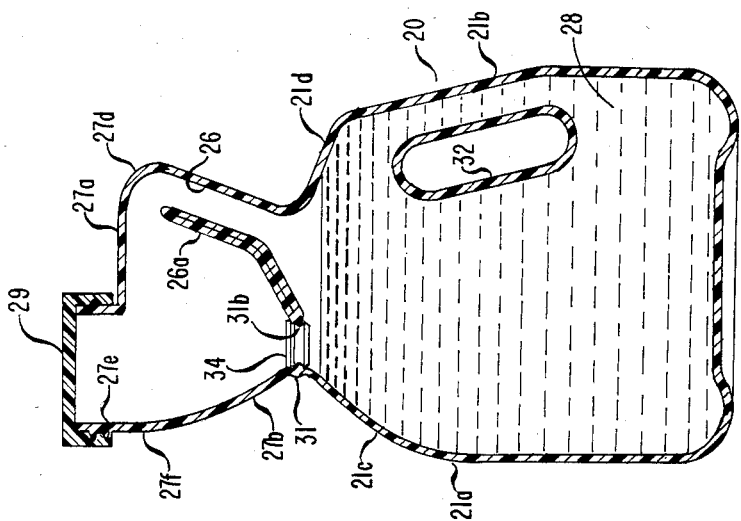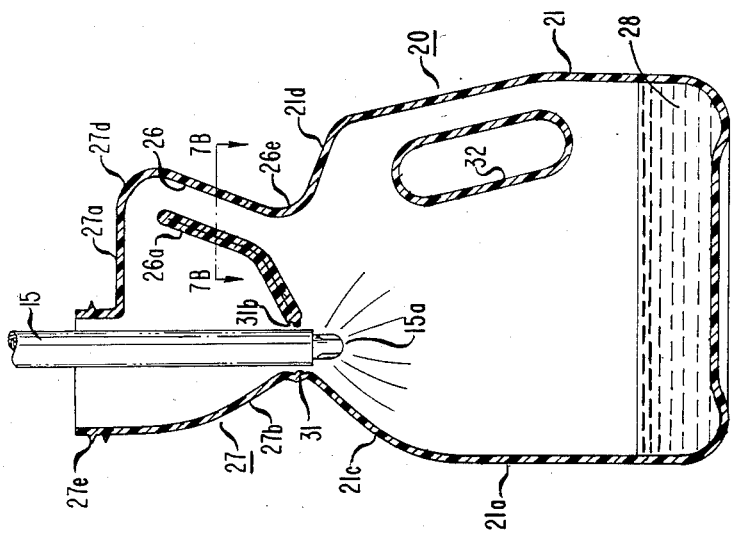

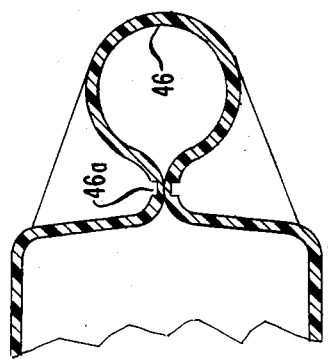
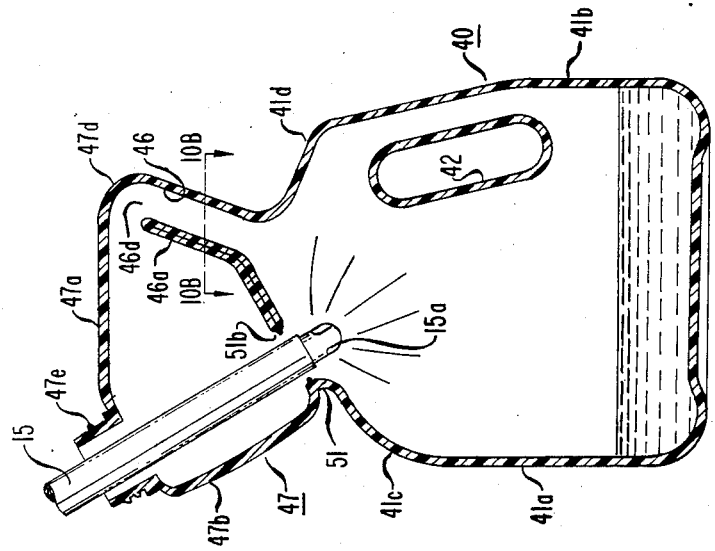

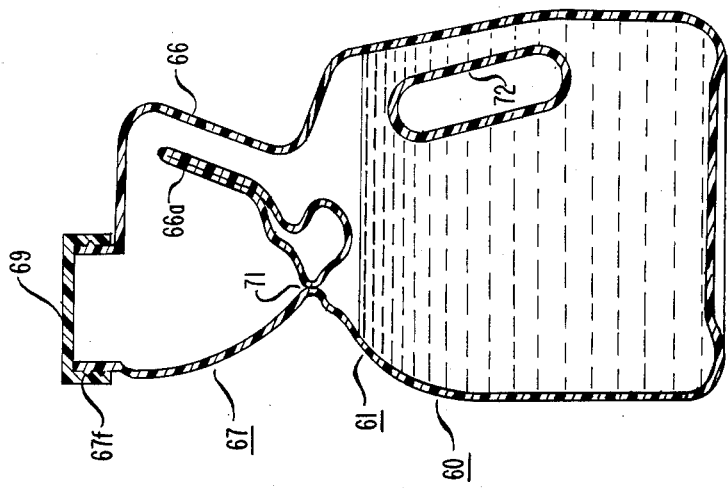
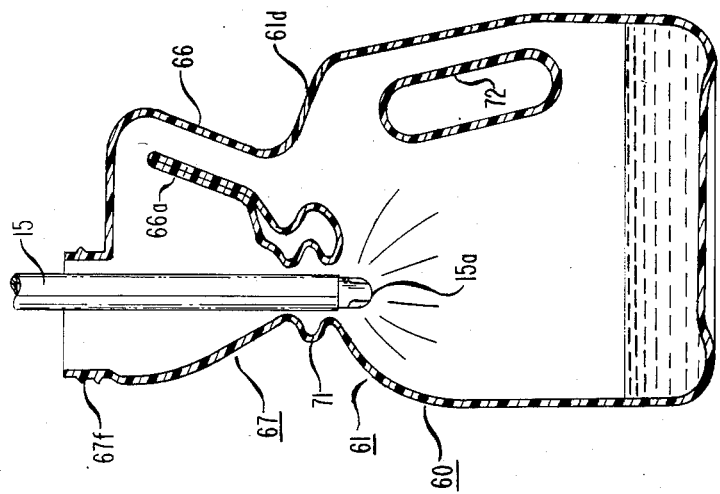

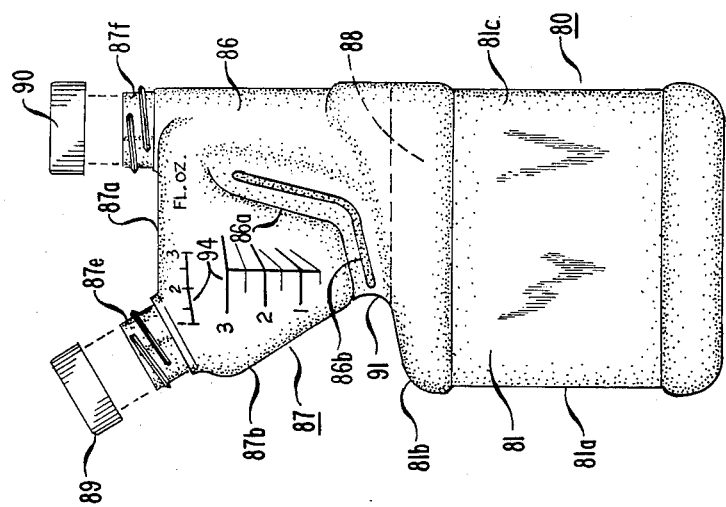
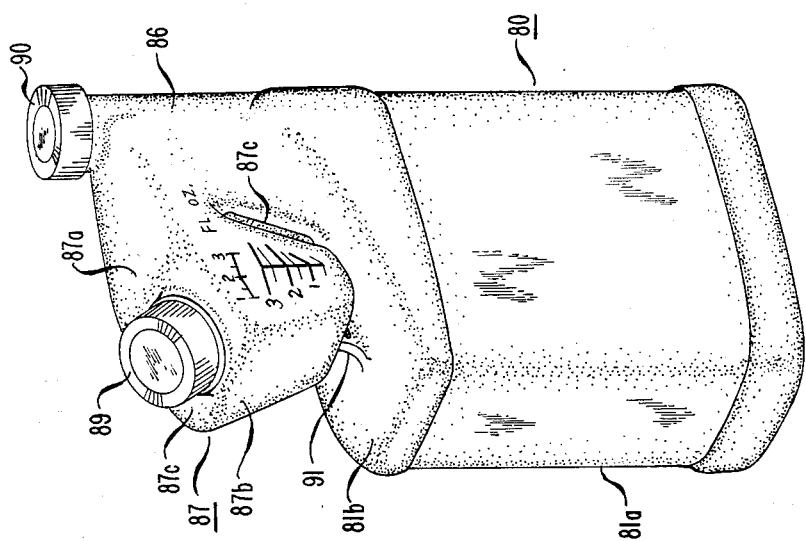

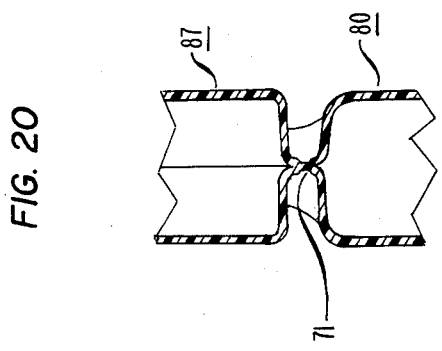
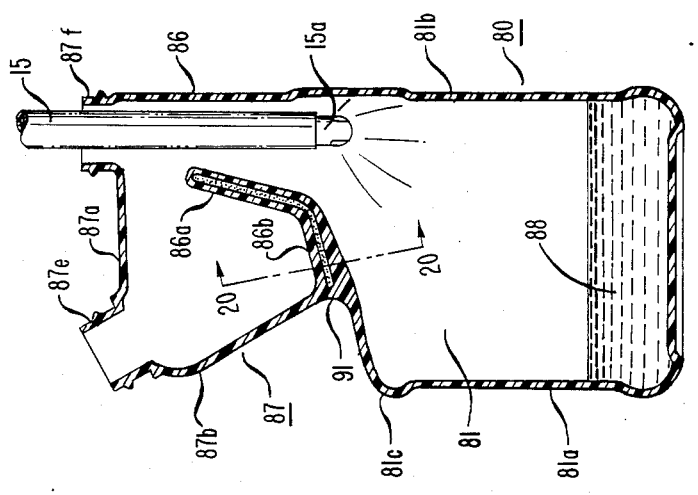

MEASURING CONTAINER WITH MODIFIED POUR-SPOUT AND METHOD AND APPARATUS FOR FILLING THE SAME

BACKGROUND OF THE INVENTION

A measuring container having a measuring head, a storage portion and a modified pour-spout, which serves to accurately measure discrete amounts of liquid poured out from the container, is disclosed in my U.S. Pat. No. 4,079,859, issued Mar. 21, 1978. A modification of the container disclosed in the foregoing patent is disclosed in my U.S. Pat. No. 4,298,038, issued Nov. 3, 1981, which includes a second opening, spaced-apart from the pour-out opening in the top of the container, the second opening being designed to facilitate filling the container.

It has been found that there is a need to improve the efficiency and reduce the cost of manufacturing and filling containers of the types disclosed and claimed in my U.S. Pat. Nos. 4,079,859 and 4,298,038.

Accordingly, it is the principal object of the present invention to provide structures and procedures which reduce the number of operational steps and which facilitate automation in the manufacture and filling of measuring containers of the general types disclosed in my U.S. Pat. Nos. 4,079,859 and 4,298,038.

These and other objects are achieved by providing a primary storage container which is formed as a unitary body with a measuring head, wherein an insert plug interposed in a neck separating the primary container and the measuring head, may be removed during the manufacturing process to facilitate interposing a fill tube through the pour-out mouth, and reinserted after the initial process is completed to provide a separation between the measuring head and the primary container.

In a first embodiment which includes a single pour-out mouth at the top of the container, the insert plug is formed integrally with a modified pour spout, which is totally removed from a neck between the measuring head and the primary storage container during the initial filling process to accommodate a fill tube inserted through the pour-out mouth, and extending through the neck into the storage container. When the initial filling has been completed, the insert is seated in the neck between the measuring head and the primary container, so that the modified pour-spout extends upward adjacent the rear wall of the measuring head, opening at its lower end into the primary storage container, and its upper end, opening into the measuring head, while sealing the primary opening between the storage container and the measuring head.

In a second type of embodiment of the invention having a single pour-out opening at the top, the neck between the primary storage container and the measuring head is vertically aligned with the primary pour-out opening, so that when the plug is removed, a fill tube can be interposed through the primary opening and down through the neck into the primary storage container. In a modification of this, in which the primary pour-out opening is disposed near the top of the container, but at an angle to the top, the neck opening is diagonally aligned with the pour-out opening, so that the fill tube can be interposed at an angle through the pour-out opening and the neck into the primary storage container. In each of the embodiments of the second type, the modified pour tube which communicates through its lower end with the primary storage container, and through its upper end with the measuring head, is formed by compression-molding a tube into the area in back of the measuring head. In these designs, the handle may be formed in the usual manner being sculpted into the side of the primary storage container.

An alternative to the removable plug for closing off the neck between the measuring head and the primary storage container is to form the neck area as an annular ring which is internally concave. After the fill tube is withdrawn from the primary container, the annular concave ring is depressed externally by automatic means to form an internally convex seal in the neck.

In a third type of embodiment which has a separate filler opening, as shown in my U.S. Pat. No. 4,298,038, and therefore, does not need a removable plug, the modified pour-spout is formed by compression-molding a tube in the area back of the measuring head in the manner of the second type, the separate filler opening being sealed once the filler operation is complete.

Each of the designs of the present invention lends itself to automation as applied during the manufacturing and filling processes.

The configuration of the first embodiment permits straight injection of the filling tube through the common opening between the primary storage chamber and the measuring head. In this case, the pour-out opening at the top of the measuring chamber has to be large enough to allow the fill tube to be offset to the center line of the common opening for insertion. After filling, the insertion plug is inserted by means operating vertically, along a straight line, and the closure applied in the usual manner. In the second type of embodiment, the closure opening is aligned with the common opening, but is set at the same angle as the empty angle of the measuring container. For the filling operation either the filling nozzle or the container must be oriented to line up the closure opening and the common opening. When the operation is complete, the plug is automatically interposed into the separating neck along the same line.

It will be understood that each of the embodiments described is especially adapted to be manufactured and filled automatically with a minimum number of operational steps.

Other objects, features and advantages of the invention will be better understood with reference to the attached drawings and the specification hereinafter.

SHORT DESCRIPTION OF THE DRAWINGS

FIG. 5 shows in perspective another fluid container of the present invention with a single pour-out opening at the top, which container includes a removable plug interposed in the neck between the primary storage container and the measuring head, and wherein the modified pour-spout comprises a tube formed by compression-molding an area behind the measuring head.

FIG. 6 is a diametrical sectional showing of the plug removed from the round neck of container of FIG. 5.

FIG. 7A shows the container of FIG. 5 in section through its central axis with the plug removed and a filler tube interposed during filling process, the section through the plane indicated by the arrows 7B—7B, being shown in FIG. 7B.

FIG. 8 shows the container of FIG. 7 in section through its central axis with the plug of FIG. 6 in place.

FIG. 10A shows the fluid container of FIG. 9 in section through its central axis with the plug removed and a tube interposed for filling the container.

FIG. 10B shows a section of the compression-molding spout of FIG. 10A through a plane indicated by the arrows 10B—10B.

FIG. 11 shows the container of FIG. 10 in section with the plug in place, and container closed with a standard closure.

FIGS. 15 and 16 show the container of FIG. 12 in vertical section along the axis indicating the modified seal illustrated in FIGS. 13 and 14 in open and closed positions, respectively.

FIG. 17 shows, in perspective, another container of the present invention having a second opening, supplemental to the pour-out opening, in which container, the modified pour spout and the separation between the measuring head and the storage container, are formed by compression-molding a tube in the area back of the measuring head.

FIG. 18 shows the container of FIG. 17 in side elevation.

FIG. 19 shows the container of FIGS. 17 and 18, in the condition of being filled through a filler tube interposed in supplemental opening.

FIG. 20 shows a section of the separation between the measuring head 87 and storage container 80 along the plane indicated by arrows 20—20 in FIG. 19.

DETAILED DESCRIPTION OF THE INVENTION

Figure 1:
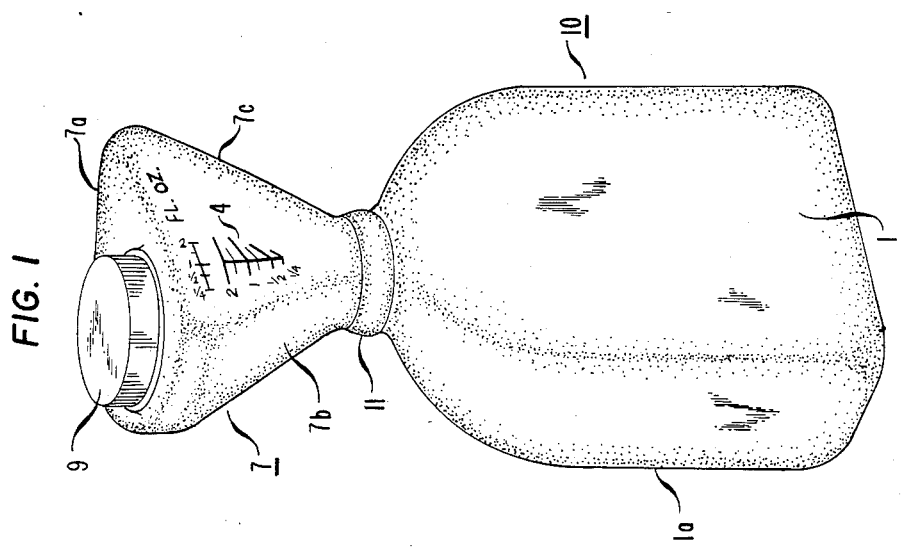
FIG. 1 shows in perspective a fluid container in accordance with the present invention with a single opening at the top, which container includes a removable plug interposed in the neck between the primary storage container and the measuring head, the plug being formed integrally with a modified pour-spout constructed to be disposed adjacent the rear wall of the measuring head.

Referring to FIG. 1 of the drawings there is shown a container 10 which includes an insert 16 (See FIG. 2) which is removably interposed into an annular bulge 11 in the neck of the container 10 to serve a dual function, as a modified pour-spout 16b in combination with a plug 16a which separates the primary storage container 1 from the measuring head 7.

Assume, say, that the storage container 1 is 3¾ inches on its side, and, say, 2⅝ inches across the end at the base, being formed from polypropylene, or similar plastic material having a wall thickness of, say, 1/16 inch. At a height of, say, 5½ inches above the base, the outer sidewall 1a of the container 10 is inwardly molded to an outer diameter of, say, 1⅛ inches, and an inner diameter of 1 inch, forming the lower edge of the annular bulge 11, which is curved outwardly at a radius of curvature of, say, ¼ inch, and extends upward, say, ½ inch in the direction of the principal axis of the container, the upper edge of the bulge returning to a diameter of 1⅛ inches. The plane passing through the upper edge of the bulge 11 forms the base of the measuring head 7, which has an outer wall 7b adjacent the pour-out spout, which wall forms an angle of, say, 45 degrees with the principal axis of the container 10, and extends upward and outward for about 2 inches, being curved inwardly at its upper end at an angle of about 45 degrees, extending ¼ inch to the cylindrical pour-out mouth 7e, which is 1½ inches in outer diameter, and projects, say ⅜ inch vertically upward. (See FIG. 3). The mouth 7e is externally screw-threaded, and is closed by a conventional, hollow cylindrical internally screw-threaded cap 9. The rear wall of 7c of measuring head 7, which is opposite the wall 7b adjacent pour-out spout 7e, extends 1⅞ inches from the upper end of bulge 11 forming an angle of, say, 25 degrees with the principal axis of the container 10. The flat, closed top 7a of the measuring head 7 extends 1¼ inches across from the base of pour-out opening 7e, forming a rounded shoulder with the upper end of sidewall 7c.

It will be understood that the scales 4, which are embossed or printed either on the internal or external surfaces of the measuring head 7, substantially as shown, are calibrated for volumetric measurements as shown and described with reference to FIGS. 8A, 8B, 8C, 9A, 9B, 9C, 9D and 10 of my U.S. Pat. No. 4,079,859, which is incorporated herein by reference.

Figure 2:
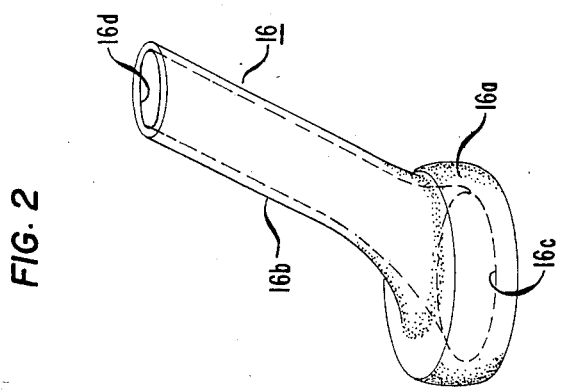
FIG. 2 shows the plug and integral modified pour-spout, removed from the container.

The lower end of the combination pour-tube and plug 16, which is shown removed from the container 10 in FIG. 2, is a semi-spherical segment sandwiched between a pair of parallel planes, having an overall diameter in the horizontal plane just exceeding 1 inch, and a depth along the principal axis of ½ inch, or whatever dimensions may be required so that it snap-fits into the annular bulge 11 in the neck container 10.

The combination plug/modified pour-spout 16 may be formed of any suitable type of elastomer, such as, for example, high density polyethylene or other plastic material, or elastomer material, such as NEOPRENE, which is not likely to be deteriorated by the contents of the container 10, and which, when in place with a slight interference fit, will provide a positive restriction between the measuring head 7 and the storage container 1. The tubular portion 16b, extends upward and outward from the top of the semi-spherical portion 16a, so that its principal axis forms an angle of, say, 25 degrees with the principal axis of the container 10. The objective of having the angle between the principal axis of tubular portion 16b and the principal axis of container 10 consistent with the angle formed in a vertical plane by wall 7b of the measuring head 7 and the axis of container 10 is to allow for the remeasure function, as described in my earlier U.S. Pat. Nos. 4,079,859 and 4,298,038 supra, when the plug/tube combination is assembled in container 10. The opening in the semi-spherical portion 16a of the plug 16 is tapered from 3/8 inch at its lower outlet into the storage container 1, to, say, 1/4 inch at the lower entrance to the tubular portion 16b. The tubular portion 16b has a substantially uniform outer diameter of, say, 7/16 inch, and an inner diameter of, say, 1/4 inch along its length, and extends, say, 1 3/4 inches from the upper plane of the semi-spherical portion to its upper end 16d which terminates about 158 inch below the inner surface of the closed top 7a, forming a fluid opening which communicates with the measuring head 7.

Figure 3:
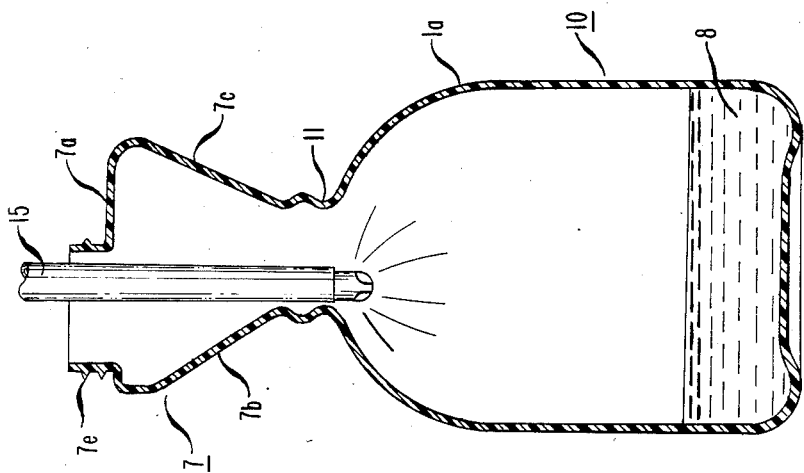
FIG. 3 shows the container of FIG. 1 in section through its central axis, with the modified pour-spout and integral plug removed from the neck, and a filler tube interposed for filling the container during the manufacturing process.

As shown in FIG. 3, the container 10 is initially filled during the process of manufacture by interposing a filler tube 15 through the opening 7e and the neck 11 into the storage container 1.

In order for this design to function properly, it is necessary that the pour-out opening 7e be at least partially aligned with the opening of neck 11 to receive the filler tube 15, and that the diameter of 7e be large enough to allow the insertion of the combination plug/modified pour-spout 16 after the storage container 1 has been initially filled.

It will be understood that the design of the element 16 is not limited to the form shown by way of illustration, but can assume many different configurations, as long as one portion 16a serves to seal off the base of the measuring head 7 while providing a passage way from the storage container 1 into the modified pour-spout 16b.

Figure 4:
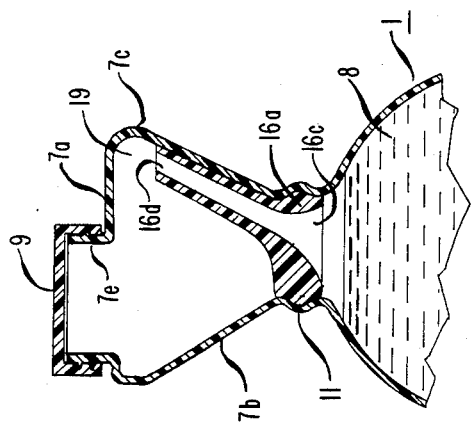
FIG. 4 is a fragmentary section of FIG. 3, with the plug of FIG. 2, interposed into the neck.

FIG. 4 is a sectional showing through the principal axis of container 10 with plug/pour-spout combination 16 in place in neck 11.

A modified form of the invention is shown in perspective in FIG. 5, and in section in FIGS. 7 and 8, which form is of substantially different construction from the container described with reference to FIGS. 1-3, but which performs a similar function of accommodating a filler tube 15 for the initial liquid filling process, as shown in FIG. 7, which is later removed, and the opening in the neck 31 closed by a replaceable plug 34, as shown in FIG. 8.

In the illustration shown in FIG. 5, the modified container 20, including the measuring head 27, and modified pour-spout 26, is blow-molded as a single unit by a process well-known in the art. In accordance with this process, the blow-mold is so constructed that the modified pour-spout is compression-molded as a separate tube which is formed as an integral part of the measuring head 27.

In the embodiment under description with reference to FIGS. 5, 7A and 8, the container 20 is formed of polypropylene, or similar plastic, and is, say, 6 5/8 inches wide from front to back and 3 1/16 inches across the ends, with a wall thickness of, say, 1/6 inch, the overall container standing, say, 10 3/4 inches high from the base, including the measuring container 27. The broad storage portion of the primary storage container 21 is substantially flat on the sides, and on the lower portion of the ends. It has a substantially vertical sidewall 21a which stands about 6 inches high on the side adjacent to the pour-out spout 27e, terminating at its upper end in a rounded shoulder 21c, which curves inwardly about 2 inches at an angle of about 47 degrees, to form an inwardly-directed concavity 31, having a radius of curvature of about 174 inch, which curves upwardly through an arc of about 5/8 inch to form part of the support for the measuring head 27. The opposite side 21b of storage container 21 extends upwardly from the base for a distance of about 3 inches, being then curved inwardly at an angle of, say, 10 degrees, extending say, 4 inches, terminating in a shoulder 21d which forms an inwardly-directed angle of, say, 20 degrees. 21d extends about 1 3/4 inches, terminating in a substantially right-angle curve 26e, which forms one wall at the base of the tube 26, which is compression-molded to the back of the measuring head 27 opposite the pour-spout 27e.

The wall 26 extends upward and outward from the concavity 26e, at an angle of, say, 18 degrees through a distance of roughly 4 inches, forming a rounded shoulder 27d with the closed top 27a of the measuring head 27.

A handle opening 32, which may be, for example, 3 inches long, and 11/16 inch wide, and say, 1 inch through the thickness, is molded into the sidewall of storage container 21 in accordance with well-known molding techniques. However, it will be understood that the handle is not necessary to the functioning of the measuring container and may be omitted.

The pour-out spout of the measuring head 27 is formed in this embodiment by a sidewall 27b which extends outward, say, 2 inches, forming an angle of, say, 30 degrees with the principal axis of the container, terminating at its upper end in a vertical wall which extends up 1 3/4 inches to form the screw-threaded spout 27e. The latter has an outer diameter of 2 inches, and an inner diameter of 1 3/4 inches.

As shown in FIG. 7A, the inner, compression-molded wall 26a forms with rear wall 26, a modified pour-spout having a substantially uniform inner diameter of, say, 3/4 inch, the sectional shape of which is indicated in FIG. 7B. The compression-molded tubular barrier 26a extends about 2 inches downwardly and inwardly from its upper end at an angle of, say 18 degrees with the principal vertical container axis, so that the axis of the modified pour-spout is substantially parallel to rear wall 26. Barrier 26a curves inwardly at its lower end, forming an angle of about 44 degrees with the vertical, and expanded in a plane transverse to the plane of the drawing to form the closed under surface of the measuring head 27, except for a small cylindrical opening 31b which is enclosed within the concavity 31. The opening 31b is, say, 3/4 inch in inner diameter, and extends 5/8 inch along the vertical axis of the container.

The pour-spout 27e is at least partially aligned with the opening 31b, so that the fill tube 15 may be interposed vertically during the liquid filling process through both openings, extending into the storage container 21, to fill the latter with liquid 28.

Figure 9:
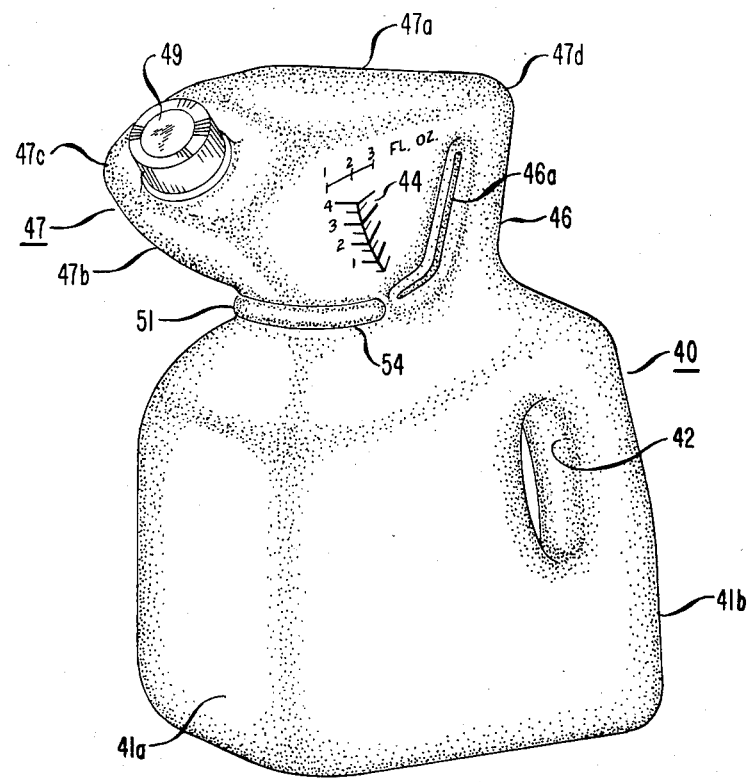
FIG. 9 shows in perspective another fluid container of the present invention having a removable plug interposed in the neck, and having a compression-molded modified pour-spout similar to the container of FIG. 5, except that the single, container pour-out opening is disposed at an angle to the top.

When the pour tube 15 is removed, the plug 34 is interposed into the neck 31b to close off the opening between the measuring head 27 and the primary storage container 21. The plug 34 is substantially cylindrical, is 3/4 inch in diameter and 5/8 inch along the axis, and is formed of a suitable elastomer, such as, for example, NEOPRENE, or any other elastomer material which does not react with the fluid stored in container 21. Referring to FIGS. 9, 10 and 11, there is shown a further modification of the embodiment shown in FIGS. 5, 7 and 8, the only difference being the angle at which the pour-out spout 47e is disposed to the principal axis of the container 40. In FIGS. 9, 10, and 11, unless otherwise indicated, similar elements to those described in FIGS. 5, 6, 7, and 8, have been assigned designating numbers to which 20 have been added.

Referring to FIGS. 9, 10, and 11, the wall 47b adjacent to the pour-spout 47e extends, say, 2 3/4 inches from the upper end of the concavity 51, forming an angle of, say, 30 degrees with the principal axis of the container. The wall 47b terminates in a small shoulder 47c, forming a right angle, one leg of which extends about ¼ inch inward to the base of the screw-threaded pour-spout 47e, which has an internal diameter of about one inch, and an overall diameter, at the base, of about 1¼ inches. The central axis of pour-spout 47e is substantially parallel to the front sidewall 47b, and is substantially perpendicular to 47c, which extends ⅜ inch from the base of pour-spout 47e, being connected in curved relation to the closed top 47a of the measuring head 47, which is connected in continuous relation to the shoulder 47d above the compression-molded pour-spout 46. The compression-molded wall 46a of the modified pour-spout, and the concavity 51, are disposed to provide a cylindrical opening 51b whose principal axis coincides with the principal axis of pour-spout 47e. Thus, with plug 54, (which is similar to plug 34 of FIG. 6) removed, the filler tube 15 is interposed along the axis of pour-spout 47e through opening 51b, extending into storage container 41 at an angle of about 45 degrees, providing another filling option.

The preceding paragraph describes this form of the container with the angular insertion of the fill pin. The same objective can be achieved by tilting the container at an angle and using a vertical fill pin insertion.

The purpose of this design is to keep the closure 49 much smaller than 29 of the FIGS. 5, 7 and 8 series.

FIGS. 12 through 16 show a container employing an alternative method of sealing off the measuring head from the primary storage container, in a container of the general form disclosed in the previously described figures. In these figures, like elements of the container, similar to those described in FIGS. 5, 7 and 8 of the drawings, have been assigned numbers to which 40 have been added and are substantially similar unless otherwise indicated.

Figure 13:
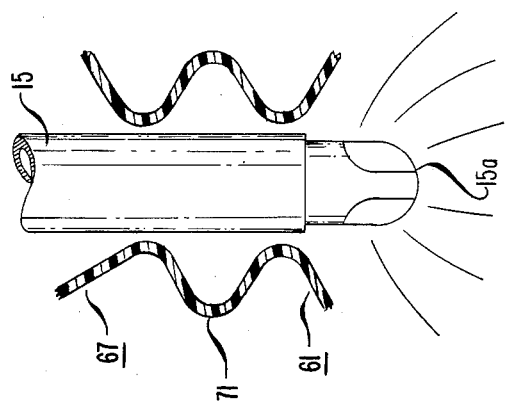
FIG. 13 is an enlarged diametrical section through the neck of the container of FIG. 12, in which the walls of the neck between the measuring head and the container comprise an annular bulge which is curved outwardly to admit the filling tube during the filling process.
Figure 14:
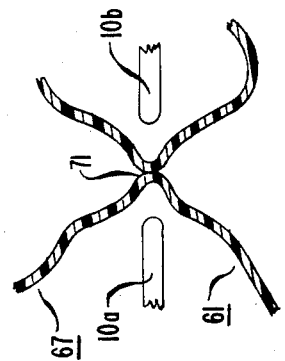
FIG. 14 shows the neck of FIG. 13 being deformed and sealed after completion of the filling process.
Figure 12:
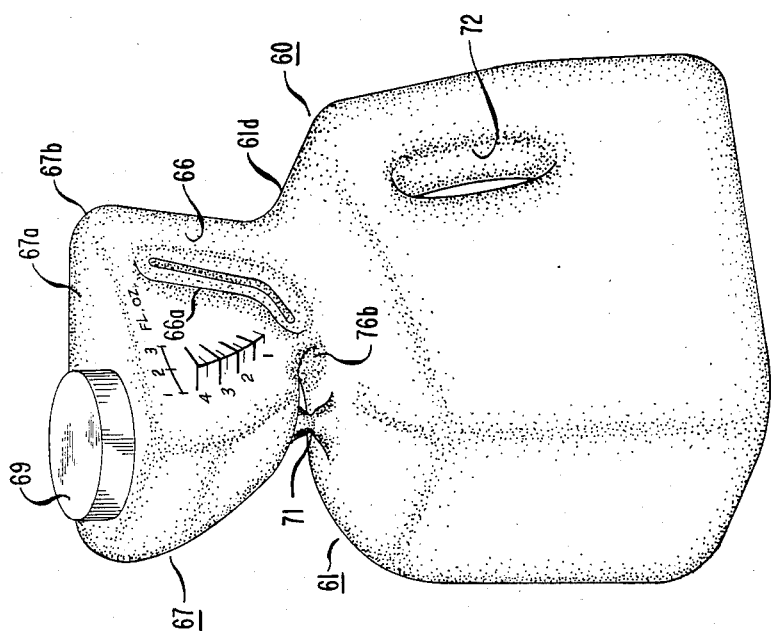
FIG. 12 shows in perspective a container of the general type shown in FIGS. 5, 7, and 8 in which the neck between the measuring head and the primary storage container is closed by collapsing and sealing an annular ring as shown in FIGS. 13 and 14.

Instead of the neck 31, as described in FIGS. 5, 7, and 8, there is substituted an annular outwardly bulged portion 71, which has been sealed as shown in FIG. 12. FIGS. 13 and 14 are fragmentary showings of neck 71, comprising an annular bulge, which is flexed outwardly, as shown in FIG. 13, and which is flexed inwardly for sealing, as shown in FIG. 14. The neck 71, which is integral with container 60 may be made of a flexible plastic material, which may be the same as that of which the container 20, or the other previously disclosed containers, is formed, such as, for example, of polypropylene, or other plastic material having a modulus of elasticity in flexure of, say, within the range, say, 50 to $150 \times 10^3$ pounds per square inch, and a wall thickness, preferably within the range 1/32 to 3/32 inch. The annular bulge 71 preferably has a radius of curvature of, say ¼ inch in the plane of the drawing, and has a depth of, say ½ inch in the direction of the axis of the container. During the filling process, as shown in the sectional showing of FIG. 15 the fill tube 15, is interposed through the neck of the container 60 along the axis of the outwardly-flexed annular ring 71. Once the filling operation has been completed, and the fill tube 15 has been withdrawn, then the annular bulge 71 is flexed inwardly, forming an inward bulge which seals against itself, as shown in FIGS. 14 and 16. It is contemplated that this operation can be performed by automatic means, such as by the oppositely-directed metal probes 10a, and 10b (FIG. 14), which may be slightly rounded, and which may alternatively be heated or sonically activated, to cause the inwardly-flexed portion of 71 to seal together, thereby closing the neck between the measuring head 67 and the primary storage container 61.

The entire description of the collapsed bulge also applies to the angular configuration of FIGS. 9, 10 and 11 and would provide for a substitute for plug 54.

Another modified form of container in accordance with the present invention is disclosed in FIGS. 17, 18, 19 and 20. Unlike the containers previously described, this container 80 is designed to be filled through a special filler opening in the top, in addition to the opening in the pour-out spout, in a manner described in detail in my U.S. Pat. No. 4,298,038, issued Nov. 3, 1981. The principal difference between the embodiment described in my prior patent, supra, and this improved embodiment, is that the modified pour-spout 86 in the embodiment under description is formed by compression-molding the rear portion of the measuring head 87, in the area opposite the primary pour-out spout 87e. The modified pour-spout 86, is thus separated from the inside of the measuring head 87 by the molded barrier 86a, which not only forms one wall of the tube 86, but is bent inwardly at substantially a right angle to form a barrier 86b between the measuring head 87 and the primary storage container 61 in the neck portion 91. The presently described container 80 is, for example, say, 7½ inches in overall height, and, say, 1¾ inches wide, the primary storage container 81a being substantially flat on its sides and ends, and rounded on the corners.

The front end 81a has a substantially straight edge which rises from the base, to a height of, say, 4 inches, forming a front shoulder 81b which is curved inwardly for, say, about 1½ inches to the inwardly-curved neck 91.

The rear end 81c, opposite the pour-out spout 87e, is substantially straight, extending to a height of about 7½ inches above the base, including the modified pour tube 86, which is, say, about an inch in inner diameter and extends upward about 3 inches from the top of the primary storage container 81.

The measuring head 87 is substantially U-shaped, resting on the upper plane of the solid neck portion 91, the outer end 87b forming an angle of, say, 38 degrees with the principal axis of the container 80, and the inner surface comprising barrier 86a, forming a smaller angle of, say, 20 degrees, with the principal axis of the container 80. Side 87b extends upward and outward, say, 2¼ inches, forming a shoulder 87c at its upper end from which the screw-threaded pour-out spout 87e projects. The latter is, say, ⅞ inch in inner diameter, and is closed with a conventional screw cap 89. The pour-out spout 87e is connected to the filler opening 87f, by the flat closed top 87a, which is, say, 1¾ inches across. The filler opening 87f is, say, about 1 inch in inner diameter, and may be sealed closed when the filling operation is completed, or closed with a conventional screw top 90.

This embodiment may be marked with the scales 94, illustrated in the side-elevational showing of FIG. 18, which are similar to those described in detail in my prior U.S. Pat. Nos. 4,079,859 and 4,298,038 included herein by reference.

FIG. 19 shows the filler tube 15 interposed into the filler opening 87f, for filling the primary storage container 81 with liquid.

FIG. 20 is a sectional showing of the molded barrier 86b through the plane indicated by the arrows 20—20 of FIG. 19.

It will be understood that the present invention is not limited to containers of the specific forms or dimensions disclosed herein by way of illustration, but only by the scope of the appended claims.

What is claimed is:

1. In a combination with a vessel comprising a primary storage container for storing liquid and a measuring head, having a pour-spout, disposed above said primary storage container, a neck disposed between said primary storage container and the base of said measuring head, said measuring head constructed to accommodate a modified pour-spout connected at its lower end at said neck and having a portion forming an angle with the principal axis of said container and extending a substantial length into said measuring head in the direction of said principal axis to receive liquid from said storage container and transport said liquid at its upper end to an area, spaced-apart from said pour-out spout, adjacent the opposite side of said measuring head, for measuring said liquid dispensed from said storage container through said modified pour-spout, the improvement wherein:

said neck has an opening which is at least partially aligned with said pour-out spout, and said neck opening is constructed to accommodate and interposed filler tube extending through said pour-out spout and said neck opening into said primary storage container, for filling said storage container through said pour-out spout; and means including a removable closure for closing the opening through said neck between said primary storage container and said measuring head upon completion of said filling operation and withdrawal of said interposed filler tube.

2. The combination in accordance with claim 1 wherein said measuring head includes a modified pour-spout connected through said neck to said primary storage container, and wherein said means including a removable closure for closing the opening through said neck comprises a flexible plug which snap-fits into and seats in said neck.

3. The combination in accordance with claim 1 wherein said means including a removable closure for closing the opening through said neck comprises an annular ring of plastic material forming an outward bulge in a direction transverse to the axis of the neck to provide an opening through said neck, and which bulge is constructed to flex inwardly to seal against itself, to close said opening through said neck.

4. The combination in accordance with claim 1 wherein said pour-out spout and said opening through said neck are aligned so that when said interposed filler tube is accommodated to extend between said pour-out spout and said neck opening, the axis of said filler tube is substantially parallel to the principal axis of said container.

5. The combination in accordance with claim 1 wherein said pour-out spout and said opening through said neck are aligned so that when said interposed filler tube is accommodated to extend between said pour-out spout and said neck opening, the axis of said filler tube makes an angle of at least about 30 degrees with the principal axis of said container.

6. The combination in accordance with claim 1 wherein the means including a removable closure for closing the opening through said neck comprises a composite member of flexible material which includes a first section comprising a plug constructed to seat in the opening through said neck between said measuring head and said primary storage container, said plug having a channel passage therethrough, and a second section integral with said first section and comprising a tubular member in the form of a modified pour-spout, said tubular member partially aligned with said channel, and said plug constructed, when in place in said neck, to close the opening in said neck between said measuring head and said primary storage container, and simultaneously to provide liquid communication through said channel between said primary storage container and the lower end of said modified pour-spout.

7. The combination in accordance with claim 1 wherein said measuring head comprises a modified pour-spout for communicating between said primary storage container and said measuring head, said modified pour-spout being formed by compression-molding a portion of said measuring head opposite to said pour-out spout to form a tube, the axis of which forms a small angle with the principal axis of said container having its apex adjacent said neck, said tube constructed to pass at its lower end through a portion of said neck opening into said primary storage container, one wall of said tube forming a barrier between the lower end of said measuring head and said primary storage container, and said tube being spaced-apart at its upper end from the closed inner wall of said measuring head, whereby said modified pour-spout is constructed to provide liquid communication between said primary storage container and said measuring head.

8. In combination with a vessel comprising a primary storage container for storing fluid and a measuring head having a pour-out spout, disposed above said primary storage container, said measuring head connected to said primary container by a neck to receive and measure fluid dispensed from said storage container through a modified pour-spout;

the improvement wherein said modified pour-spout is formed by compression-molding a portion of said measuring head to provide a tube adjacent the rear wall of said measuring head, the axis of which tube forms a small angle with the principal axis of said container having an apex adjacent said neck, and said tube constructed to pass at its lower end through a portion of said neck opening into said primary storage container, one wall of said tube forming a barrier between the lower end of said measuring head and said primary storage container, and said tube being spaced-apart at its upper end from the closed inner wall of said measuring head, to provide liquid communication between said primary storage container and said measuring head.

9. In a vessel comprising a primary storage container for storing liquid and a measuring head having a pour-out spout, disposed above said primary storage container, a neck disposed between said primary storage container and the base of said measuring head, said measuring head constructed to accommodate a modified pour-spout connected at its lower end through said neck and forming a small angle with the principal axis of said container having its apex adjacent said neck, to receive liquid from said storage container and dispense said liquid at its upper end into said measuring head in an area spaced-apart from said pour-out spout on the opposite side of said measuring head; the method steps comprising:

forming an opening in said neck which communicates between the base of said measuring head and said storage container, which opening is at least partially aligned with said pour-out spout, for filling said primary storage container through said pour-out spout, interposing a filler tube through said pour-out spout and said neck opening into said primary storage container; and at the termination of the filling process, closing the opening in said neck between said primary storage container and said measuring head with a removable closure.

10. The method in accordance with claim 9 wherein said measuring head includes a modified pour-spout connected through said neck to said primary storage container, wherein the step of closing the opening through said neck comprises snap-fitting and seating a flexible plug into said neck.

11. The method in accordance with claim 9 wherein said neck comprises an annular ring of flexible plastic material which forms an outward bulge in a direction transverse to the axis of the neck when the neck is open, wherein the step of closing the opening through said neck comprises flexing the outward bulge forming said annular ring inwardly to seal against itself.

12. The method in accordance with claim 9 wherein said pour-out spout and said neck opening are at least partially vertically aligned, the step of interposing said filler tube vertically through said pour-out spout and said neck opening into said primary storage container during the filling process.

13. The method in accordance with claim 9 wherein said pour-out spout and said neck opening are at least partially aligned in a direction making an acute angle with the principal axis of the container, interposing said filler tube in the direction of said acute angle through said pour-out spout and said neck opening into said storage container.

14. The method in accordance with claim 9 which comprises the step of interposing a removable closure of flexible material which is a composite which includes a first section comprising a plug constructed to seat in the opening through said neck between said measuring head and said primary storage container, said plug being formed with a channel passage therethrough, and forming said plug with a second section integral with said first section and comprising a tubular member in the form of a modified pour-spout, said tubular member being at least partially aligned with said channel and constructed, when said plug is in place in said neck, to close the opening in said neck between said measuring head and said primary storage container, and simultaneously to provide communication through said channel between said primary storage container and the lower end of said modified pour-spout.

15. The method in accordance with claim 9, wherein said measuring head comprises a modified pour-spout for communicating between said primary storage container and said measuring head, the step of forming said modified pour-spout by compression-molding a portion of said measuring head to provide a tube adjacent the rear wall of said measuring head opposite to said pour-out spout, the axis of which tube forms a small angle with the principal axis of said container having its apex adjacent said neck, which tube is constructed to pass at its lower end through a portion of said neck opening out into said primary storage container, and said tube being constructed at its upper end to be spaced-apart from the closed inner wall of said measuring head, whereby said modified pour-spout is formed to provide liquid communication between said primary container and said measuring head.

16. In a vessel comprising a primary storage container for storing fluid and a measuring head having a pour-out spout disposed above said primary storage container, said measuring head being connected through a neck to receive and measure fluid dispensed from said storage container through a modified pour-spout:

the method of forming said modified pour-spout which comprises the step of compression-molding a portion of said measuring head to provide a tube adjacent the rear wall of said measuring head, the axis of which tube forms a small angle with the principal axis of said container having its apex adjacent said neck, and which tube is constructed at its lower end to provide a modified pour-spout which opens through said neck into said primary storage container, forming one wall of said tube as a barrier between the lower end of said measuring head and said primary storage container, and said tube being constructed at its upper end, to be spaced-apart from the closed inner wall of said measuring head, whereby said modified pour-spout provides liquid communication between said primary storage container and said measuring head.

* * * * *